March 31, 1936.  C. D. GALLOWAY  2,035,744
STORAGE BATTERY
Filed April 28, 1933  2 Sheets-Sheet 1
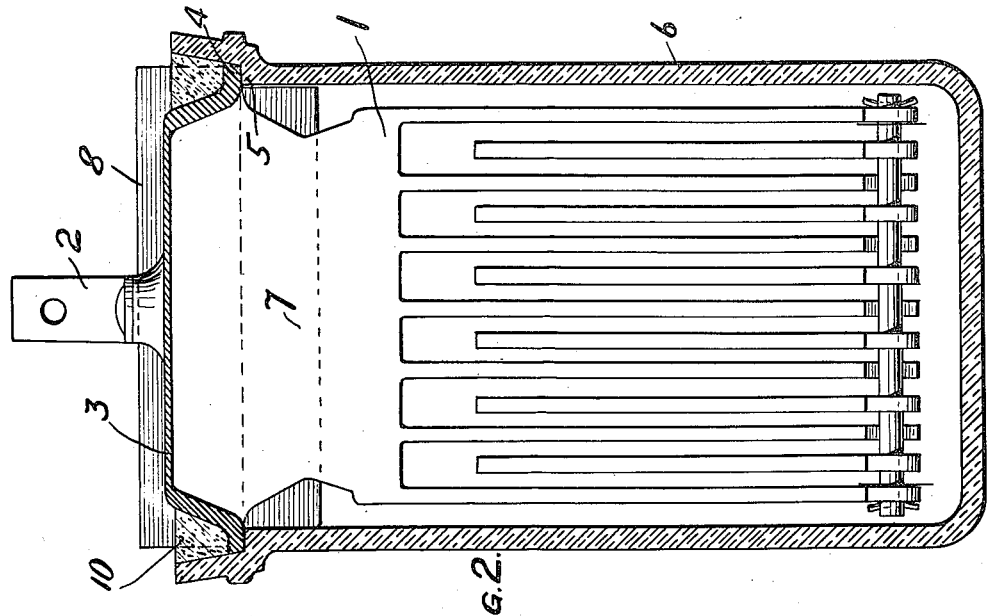
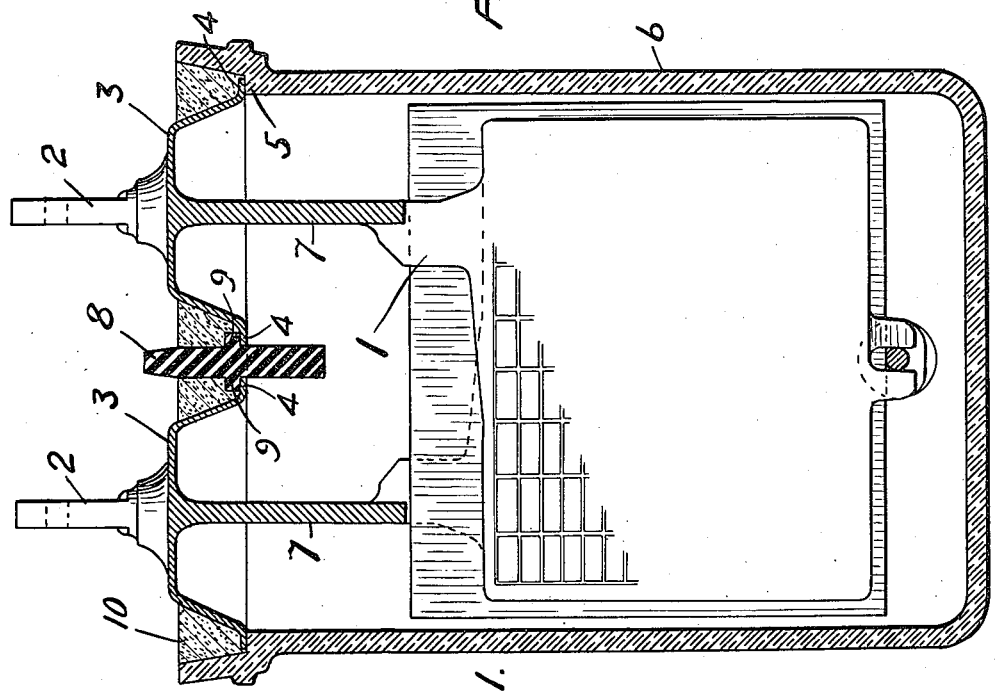
INVENTOR
Charles D. Galloway
BY
Augustus B. Stoughton
ATTORNEY.

March 31, 1936.  C. D. GALLOWAY  2,035,744
STORAGE BATTERY
Filed April 28, 1933  2 Sheets-Sheet 2

INVENTOR
Charles D. Galloway
BY
Augustus B. Stoughton
ATTORNEY.

WITNESS:

Patented Mar. 31, 1936

2,035,744

UNITED STATES PATENT OFFICE 2,035,744

STORAGE BATTERY

Charles D. Galloway, Philadelphia, Pa., assignor to The Electric Storage Battery Company, Philadelphia, Pa., a corporation of New Jersey Application April 28, 1933, Serial No. 668,330

6 Claims. (Cl. 136—170)

The principal object of the present invention is to oppose and prevent creepage of electrolyte between the cover and the terminal posts and to eliminate confined spaces around the post in which, if present, electrolytic corrosion might occur, and to these and other ends hereinafter set forth the invention, generally stated, consists in making the terminal posts and cover sections, which rest on the jar, of conducting alloy or similar metal, and integrally connected, and in interposing an insulating barrier between the cover sections.

The invention also comprises the improvements to be presently described and finally claimed.

In the following description reference will be made to the accompanying drawings forming part hereof and in which Figure 1 is a transverse sectional view taken in the plane of the plates of parts of a storage battery showing the invention in application thereto.

Fig. 2 is a transverse sectional view taken at right angles to Fig. 1, but with the separators and some of the plate lugs omitted.

Figure 3:
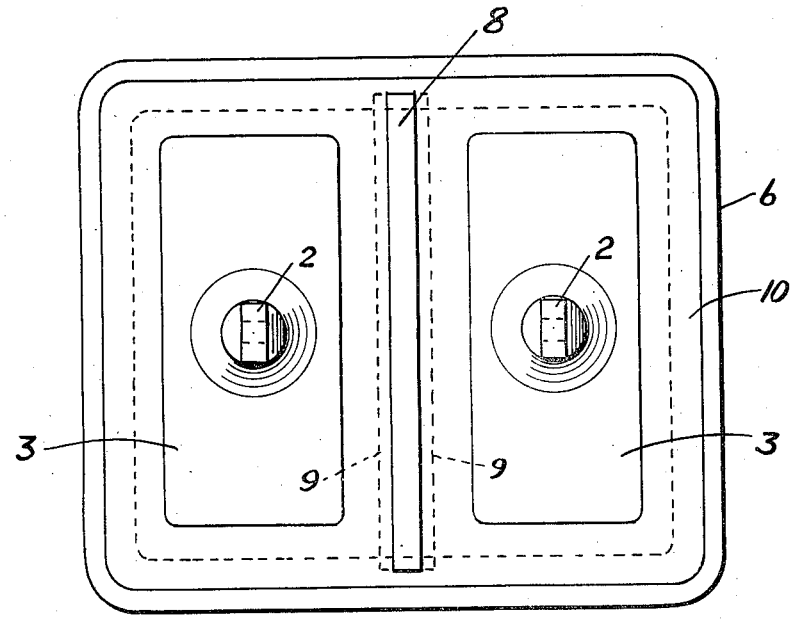
Fig. 3 is a top or plan view.
Figure 4:
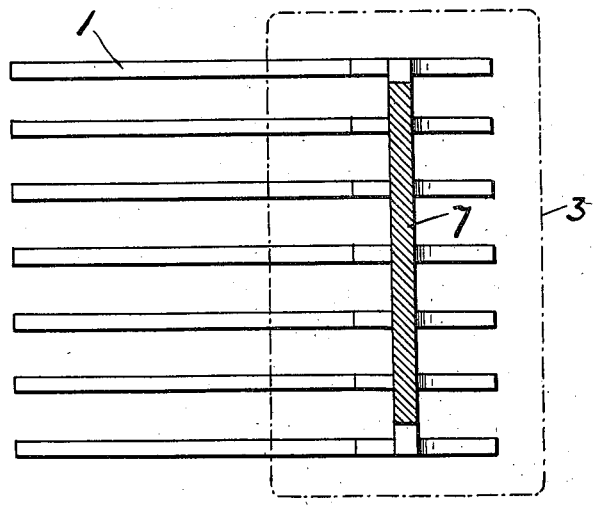
Fig. 4 is a horizontal sectional view showing the metallic or alloy strap connection which depends from and is integral with the cover.

In the drawings the electrode generally indicated at 1, includes an alloy terminal post 2 and an alloy cover section 3, integrally attached to or made part of the terminal post, and provided with an alloy seat portion 4. The seat portion 4 rests upon an insulating ledge or rim 5 of a receptacle or cell 6, which may be glass, hard rubber or the like. The cover section 3 is shown as of dome form provided with a flange as indicated at 4, which is seated on the ledge 5. Depending from the cover section 3 and integrally connected therewith is a strap 7, and it extends between the walls of the cover section. There are two electrode structures and the integral metal or alloy cover sections of each are spaced apart. In the space thus provided is arranged a strip 8 of insulating material, as hard rubber. This strip is seated at its ends on the ledge 5 and it extends above and below the cover sections 3.

The strip 8 is beveled towards its top and is provided with beads 9 which overlie the cover section flanges 4. 10 indicates sealing compound which surrounds each of the cover sections 3.

Since the terminal posts 2 and strap connections 7, and cover sections 3 are integral, it follows that creepage of electrolyte between them is impossible, while at the same time the electrodes of opposite sign are insulated by the barrier at 8. Creepage of electrolyte at the margin of the cover sections is opposed by the sealing compound 10 and by the strip 8 which extends well above and below the cover.

The strap 7 acts as a beam for transmitting the weight of the plate group to the supporting ledge 5, and the flange 4 adjacent the bearing points of strap 7 is thickened as shown in Fig. 2 to provide for this weight. This construction permits the balance of the cover section, which is not subjected to appreciable weight, to be made comparatively light. In other words the strap 7 is an arch structure spanning and supported by the jar walls and it carries the weight of the depending plates and of the superposed cover.

The words integral and integrally are used to define a unitary structure, whether the same is made or cast in one solid piece, or is separately cast in several pieces joined as by lead burning or the like.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. For a storage battery, a domed cover plate section having a depending marginal flange at its entire perimeter and a terminal post and a plate strap connection extending between the walls of the cover plate section, all of each of said parts being of metal and all said parts being integrally united.

2. An electrode for a storage battery having a metallic terminal post and a metallic cover plate section integrally attached to the metallic terminal post, said cover plate section being provided at its entire perimeter with a depending marginal seat portion.

3. An electrode for a storage battery having a metallic terminal post and a domed metallic cover plate section integrally attached to the metallic terminal post, said cover plate section being provided at its entire perimeter with a depending marginal seating flange.

4. In a storage battery, the combination of, a container composed of insulating material and having a ledge, domed metallic cover sections, each having flanges at its entire rim, portions of said flanges being seated on said ledge, said cover sections being spaced from each other at their adjoining parts, a strip of insulating material interposed between the cover sections and seated on said ledge, sealing compound all around the rims of said cover sections, and electrodes having metallic terminal posts integral with the cover sections.

5. In a storage battery, the combination of, a container composed of insulating material and having a ledge, domed metallic cover sections, each having flanges at its entire rim, portions of said flanges being seated on said ledge, said cover sections being spaced from each other at their adjoining parts, a strip of insulating material interposed between the cover sections and extending continuously across said container above and below said cover sections and seated on said ledge and having beads resting on parts of the cover flanges, sealing compound all around the rims of the cover sections, and electrodes having metallic terminal connections connected with the cover sections.

6. In a storage battery, the combination of: a container composed of insulating material having a ledge; metallic cover sections having at their entire rims depending, marginal flanges; plate groups in said container; and flat, vertically extending straps each integral with one of said cover sections and with one of said plate groups, said straps spanning said ledges and supported thereby and from which the plate groups are suspended.

CHARLES D. GALLOWAY.